(12) United States Patent
Bua

(10) Patent No.: US 10,068,448 B2
(45) Date of Patent: Sep. 4, 2018

(54) SYSTEM AND METHOD FOR DETECTING THEFTS INSIDE SHOPS

(71) Applicant: Salvatore Bua, Arogno (CH)

(72) Inventor: Salvatore Bua, Arogno (CH)

(*) Notice: Subject to any disclaimer, the term of this patent is extended or adjusted under 35 U.S.C. 154(b) by 198 days.

(21) Appl. No.: 14/623,856

(22) Filed: Feb. 17, 2015

(65) Prior Publication Data
US 2015/0235535 A1    Aug. 20, 2015

(30) Foreign Application Priority Data

Feb. 18, 2014 (CH) ........................................ 0214/14
Mar. 14, 2014 (IT) .............................. RM2014A0134

(51) Int. Cl.
*H04N 7/18* (2006.01)
*G08B 13/22* (2006.01)

(52) U.S. Cl.
CPC ............... *G08B 13/22* (2013.01); *H04N 7/18* (2013.01)

(58) Field of Classification Search
CPC .................................. G08B 13/22; H04N 7/18
See application file for complete search history.

(56) References Cited

U.S. PATENT DOCUMENTS

| 8,448,858 | B1 | 5/2013 | Kundu et al. | |
| 2007/0118324 | A1* | 5/2007 | Gulati | G01J 5/0003 702/131 |
| 2008/0246613 | A1* | 10/2008 | Linstrom | G08B 13/19695 340/572.4 |
| 2011/0261202 | A1* | 10/2011 | Goldstein | G08B 13/19602 348/149 |
| 2012/0008819 | A1* | 1/2012 | Ding | G06K 9/00335 382/100 |
| 2014/0132771 | A1* | 5/2014 | Gustafsson | G06K 9/00771 348/152 |

* cited by examiner

Primary Examiner — Mohammed S Rahaman
(74) Attorney, Agent, or Firm — Lucas & Mercanti, LLP.

(57) ABSTRACT

Method for detecting thefts inside shops using at least one thermocamera comprising at least one data processing unit receiving at least one thermal image, comprising providing a controlled area of at least part of an image defined by a perimeter comprising at least one exit length and at least one payment interface length; electronically checking the exceeding value of predetermined minimum temperature of at least one pixel of said image; electronically associating said pixel with an object to be checked; plotting the path of said object by associating at the point in which said object exits from said exit length and/or calculating the crossing time of the object as time passed from said associating step to the moment in which said object exits from said exit length; and sending or activating an alarm signal as the path or the crossing time of said object meets a predetermined criterion.

13 Claims, 2 Drawing Sheets

| H pixel | V pixel | H FOV [°] | V FOV [°] | D[m] | H FOV [m] | V FOV [m] | I FOV [mm] |
|---|---|---|---|---|---|---|---|
| 160 | 128 | 25 | 19 | 3 | 1.33 | 1.00 | 8.18 |
| 160 | 128 | 25 | 19 | 4 | 1.77 | 1.34 | 10.91 |
| 160 | 128 | 25 | 19 | 5 | 2.22 | 1.67 | 13.64 |
| 160 | 128 | 25 | 19 | 6 | 2.66 | 2.01 | 16.36 |
| 320 | 256 | 25 | 19 | 3 | 1.33 | 1.00 | 4.09 |
| 320 | 256 | 25 | 19 | 4 | 1.77 | 1.34 | 5.45 |
| 320 | 256 | 25 | 19 | 5 | 2.22 | 1.67 | 6.82 |
| 320 | 256 | 25 | 19 | 6 | 2.66 | 2.01 | 8.18 | though inspection of consumers, for a little supermarket, also in case of normal flood of customers.

Therefore, the Applicant found that systems for preventing thefts, in supermarkets, are not completely effective.

Therefore, with the present invention, the Applicant set itself the purpose to describe a system and a method for detecting thefts inside shops suitable to sell cold products, which allows the afore described drawbacks to be solved.

SYSTEM AND METHOD FOR DETECTING THEFTS INSIDE SHOPS

CROSS-REFERENCE TO RELATED APPLICATIONS

The present application claims the priority of Swiss Patent Application No. CH00214/14, filed Feb. 18, 2014 and Italian Patent Application No. RM2014A000134, filed Mar. 14, 2014, the contents of which are incorporated herein by reference.

TECHNICAL FIELD

The present invention refers to the field of security systems and, in detail, it concerns a system and a method for detecting thefts inside shops suitable to sell cold products.

BACKGROUND OF THE INVENTION

It is known that supermarkets have always been places in which little thefts can be made quite easily. In fact, in supermarkets goods of little size can be acquired, which become easy to hide inside pockets or the clothes themselves because of their size.

Where phenomena of economic crises became burdensome, important increases of thefts in supermarkets have been reported and, more in general, in all shops of the Mass Merchandise Channel; although the entity of every single theft is not relevant, in itself, on supermarket budget, particularly if of great size, however the sum of these little thefts can cause, during the month, also relevant decreases of sales, about 10% or more. The Applicant found that a lot of thefts just concern deep-frozen products or anyway intended to be kept in refrigerated cabinets. Therefore, if the most shoplifted goods have to be profiled, those associated with the cold chain have a role higher than others.

Over the years different system types have been invented for preventing thefts, which can also be installed on goods intended to be sold in supermarkets. These systems of the known art comprise, for example, RFID tags included on/in the packaging, for example of Compact Discs or DVDs, the tags causing the activation of an alarm in case of passing by a sensor preferably placed at a cash desk.

RFID tags are inappropriate for the installation on fruits or vegetables, or deep-frozen food packagings, for example, just because on the one hand they have to be positioned on a flat surface, on the other hand the cold could damage their performances. The cost itself of each RFID tag, being high, can be accepted only where it is associated with high value goods, such as for example electronic devices.

Another technique dissuading from thefts is the use of guards at the supermarket exits, which are authorized—if allowed by law—to make body search on persons considered susceptible to have stolen goods. However, also this system suffers from some drawbacks: from one hand subjecting a customer to a body search is embarrassing and could become cause of loss of other customers that—although honest—do not want to be subjected to such a body search type. Secondly, subjecting one or more customers to body search can not be systematic: in other words, it is not possible nor sensible to subject all customers to body search, as this might cause long lines at supermarket exits, particularly in peak time; moreover, this could be not a minor cost for a supermarket, since the presence of only one guard would unlikely be sufficient to face the need of a sufficiently

SUMMARY OF THE INVENTION

According to a first aspect the present invention concerns a method for detecting thefts inside shops, the method comprising the use of at least one thermocamera, the thermocamera comprising, or being electrically connected with, at least one data processing unit suitable to receive at least one thermal image; the method comprising the steps of:

providing a controlled area of at least part of an image; the controlled area being defined by a perimeter; the perimeter comprising at least one exit length and at least one payment interface length;

electronically checking the exceeding of a value of predetermined minimum temperature of at least one pixel of said image;

electronically associating said at least one pixel with an object to be checked:

plotting the path of said object to be checked by said associating step at the point in which said object to be checked exits from said exit length and/or calculating the crossing time of the object to be checked as the time passed from said associating step to the moment in which said object to be checked exits from said exit length;

sending or activating an alarm signal, the step of sending or activating the alarm signal being carried out as the path or the crossing time of the object to be checked meets a predetermined criterion.

Advantageously, the criterion comprises a step of electronically checking that the path of the object to be checked forms a line between the associating step and the point in which the object to be checked exits from the exit length without intersecting said at least one payment interface length.

Preferably, the controlled area is placed next to at least one respective cash desk for the payment of said products or goods and said at least one thermocamera is installed to detect an image at said at least one respective cash desk.

Conveniently, the payment interface length is a perimeter length interposed on said image between said controlled area and said respective cash desk for the payment of products.

Preferably, the method comprises the step of detecting the maximum temperature inside said controlled area and the step of secondly associating said maximum temperature with a user, and wherein said predetermined criterion comprises:

a step of calculating the user's crossing time as the time passed between said secondly associating step and the moment in which said user exits from said exit length;

a step of electronically checking that said user's crossing time is substantially equal to the crossing time of the object to be checked.

Conveniently, said step of sending said alarm signal comprises at least one action selected from:

sending said alarm signal to a remote computer (400) suitable to be electrically connected to user interface means (410) of alarm signals coming from a plurality of cash desks;

activating a sound and/or visual alarm installed on said respective cash desk (200) for the payment of goods.

Preferably, the method comprises a step of transmitting at least one radiometric image to a remote computer designed to allow said radiometric image to be represented.

Conveniently, the method comprises a step of storing data in a memory designed to store data.

Preferably, the method comprises a step of representing the condition of said alarm signal transmitted from said at least one thermocamera, by means of said user interface means.

Advantageously, the method comprises a step of moving said thermocamera along at least one axis.

BRIEF DESCRIPTION OF THE FIGURES

The invention will be therefore described by referring to the enclosed figures, which illustrate a not-limitative preferred embodiment of a system and method of detecting thefts inside supermarkets. In detail.

DETAILED DESCRIPTION OF THE INVENTION

Figure 1:
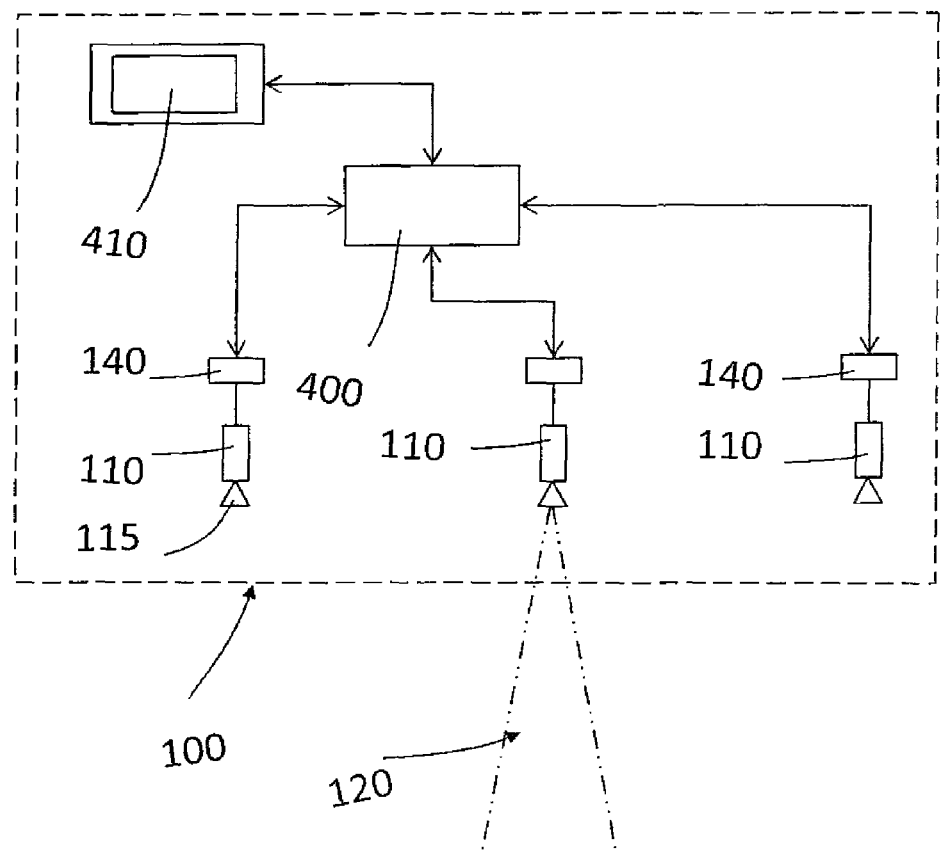
FIG. 1 shows a schematic view of the system object of the present invention, in detail positioned at a plurality of cash desks for the payment of goods.
Figure 1:
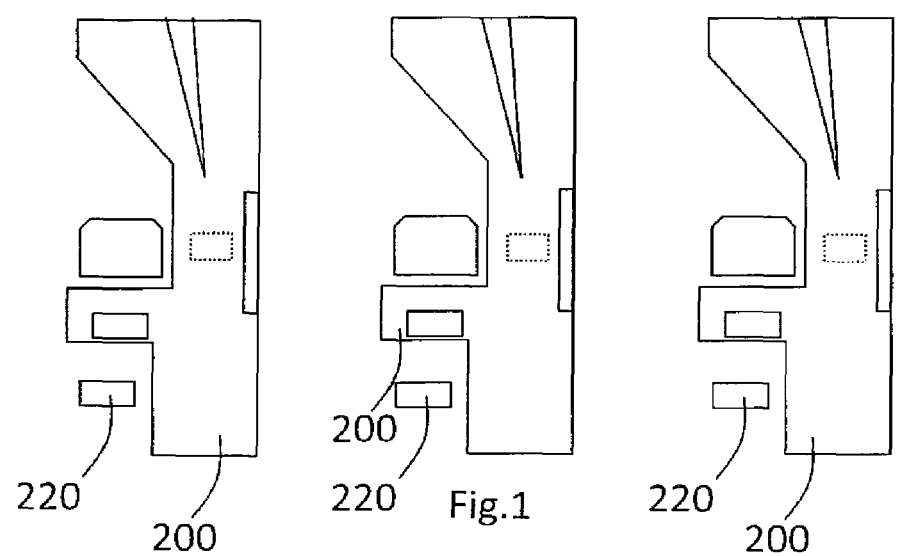

With reference numeral 100 a system for detecting thefts inside supermarkets is indicated on the whole.

The system 100 comprises, in its more simple embodiment, at least one high-resolution thermocamera 110 implementing a thermal detecting or identifying means suitable to produce a radiometric image on an output terminal thereof, i.e. the image being distinguished by a plurality of colors, each representing a specific absolute temperature. Such a thermocamera comprises, or is electrically connected with, a data processing unit 140 specifically configured for carrying out processing operations of thermal images useful for allowing the detection in case a supermarket customer makes shoplifting by trying to stole products or goods 10 distinguished from being kept at a temperature appreciably lower than the body temperature, i.e. able to produce a thermal differential of at least 10° C. with respect to the human body or, preferably, a thermal differential greater than 30° C. with respect to the human body. Such products or goods 10 are then typically deep-frozen goods, ice creams, or more in general food products suitable to be preserved at a temperature lower than the ambient temperature. Nevertheless, the present invention allows to detect stolen objects consist of liquids, such as bottles and cans or containers containing liquids.

The thermocamera 110 is directed in such a way that the lens 115 is framing an area in front of the respective cash desk 200 for the payment of goods inside the supermarket, preferably a distance comprised between 3 and 6 meters, so that an area equal to that one filled by a human being is captured without being too much distant to have a careful definition of the thermal image 700 of the same and possible stolen goods. In detail, the thermal image 700 is suitable to represent figures according to a chromatic scale preferably defined, but without limitation, between a first value of minimum temperature corresponding to blue color and a second value of maximum temperature corresponding to red color. Because of representation requirements, in the enclosed FIG. 2 the colors are not represented but substituted with dotted line of different density to represent different colors. The denser area corresponds to a cooler area, whereas areas less dense are hotter areas. Therefore, the denser central area corresponds to stolen goods.

To allow an easier positioning of thermocameras 110, the system object of the present invention further comprises guides 300 made of metal, preferably although not limited to aluminum, having supports able to allow thermocameras 110 to be moved along at least one axis. This is particularly advantageous when the system object of the present invention comprises a great plurality of thermocameras 110 placed side by side at the respective cash desks 200.

Therefore, in other terms through the thermocamera 110, the "value" of stolen goods is attributed to part of the captured image if such an area meets one or more criteria described hereinafter in more detail. Through the data processing unit 140, the system of the present invention first of all allows detecting with high precision if, and secondarily where, a customer of the supermarket hides a stolen product or goods.

In fact, in detail, the data processing unit 140 allows identifying the presence of stolen goods or products according to at least one criterion depending on the type of travel or the time of travel in a predetermined controlled area of the object presumed to be stolen.

First of all, a controlled area of at least part of an image 700 acquired by the thermocamera 110 is predefined. The controlled area is defined by a perimeter, by way of example a rectangle.

The perimeter of the controlled area comprises at least one exit length and at least one payment interface length.

The preselected controlled area on the image 700 corresponds to a shop area typically at the cash desk, typically in the area in front of the cash desk. That is to say such a corridor usually between the two cash desks in which the user who acquired the goods passes, places the goods on the conveyor belt and after the payment for goods moves beyond the cash desk to exit the shop.

The payment interface length is a perimeter length interposed on the image 700 between said controlled area and the respective cash desk for the payment of products and, for example, it can be a side of the rectangle or a portion thereof, if the perimeter of the controlled area is represented by a rectangle.

The exit length is a perimeter length interposed on the image 700 between two cask desks and opposed to that from which users arrive and, for example, it can be a side of the rectangle or a portion thereof. If the perimeter of the controlled area is represented by a rectangle, it can be the forward side adjacent to the side representing the payment interface length.

In detail, a first criterion comprises an electronic checking of the exceeding of a value of predetermined minimum temperature of at least one pixel of the image the thermocamera 110 acquired.

At this point, the processing means electronically associate the afore said at least one pixel with an object to be checked, by presuming the latter to be stolen goods.

Therefore, the processing means plot the path of the object to the checked by starting from the association point to the point corresponding to the moment in which the object to be checked exits from the exit length.

Therefore, a step of electronically checking that the path of the stolen object forms a continuous line between the association point and the moment in which the object to be checked exits from the exit length, is carried out. In particular, if the path does not intersect the payment interface length, it means that the object to be checked has never been presented to the cash desk for its payment and the data processing unit 140 will provide to activate a detection alarm of stolen goods.

Vice versa, if the line representing the path does intersect the payment interface length and then comes back in the controlled area before exiting through the exit length, it means that the object has been presented to the cash desk for its payment and no detection alarm of stolen goods is activated.

This allows detecting stolen cold goods. If on at least part of the area of the image captured by the thermocamera 110 (identification sub-area) a temperature lower than the limit reference temperature stored in the memory 120 is noticed and such an object follows a path in the controlled area not intersecting the payment interface length.

Alternatively or additionally, a second criterion for detecting stolen goods is based on the crossing time of said object to be checked.

In detail, the method comprises a step of detecting the maximum temperature inside the controlled area and a step of secondly associating the maximum temperature, just detected, with a user.

The predetermined criterion comprises:
 a step of calculating the user's crossing time as the time passed between the secondly associating step and the moment in which the user exits from the exit length; and
 a step of electronically checking that the user's crossing time is substantially equal to the crossing time of the object to be checked.

If the user's crossing time is substantially equal to the crossing time of the object to be checked, it means that the object to be checked has never been presented to the cash desk for its payment and the data processing unit 140 will provide to activate a detection alarm of stolen goods.

Vice versa, if the crossing time of the object to the checked is different, typically longer than the user's crossing time, it means that the object to be checked has been presented to the cash desk for its payment and, consequently, no detection alarm of stolen goods would be activated.

For both criteria, images received by the thermocamera 110 are of radiometric type and thereby allow to advantageously identify an absolute temperature value, with respect to the reference value. Among other things, through the analysis of an image of radiometric type, it is possible to allow checking if stolen goods are initially contained in a freezer cabinet (as in case of deep-frozen products, for example) or in a refrigerated cabinet (as in case of yogurts).

An additional positive identification criterion of stolen goods comprises the analysis of the measure of the sub-area of the image captured by the thermocamera 110 that has either a temperature lower than the limit reference temperature or than the thermal differential of reference. The area measure of such a sub-area is compared with a measure of a minimum reference area and, in case said measure of the sub-area is greater than said minimum reference area, the detection alarm of stolen goods would be activated. In other terms, a minimum number of pixels will be therefore necessary, depending on the relative position between the thermocamera and the respective cash desk and on the resolution of the thermocamera itself, so that the alarm can go off.

Obviously, the above described three criteria could be combined altogether in any form. Moreover, the reference values of the limit reference temperature and the minimum reference area both stored in the memory 120 could by advantageously changed by a system superuser.

The detection alarm of stolen goods can cause the activation of a sound or visual signal (signaling lamp 220) installed at said cash desk 200 and electrically connected with said data processing unit or, alternatively, it can be transmitted to a remote computer 400, on which there is a user interface device, specifically a monitor 410, on which one or more detection alarms of stolen goods are displayed and each combined with a respective cash desk 200. In this way it is possible to control also a great number of cash desks in a centralized way.

Also the images captured by various thermocameras 110 installed on the respective cash desks 200 can be displayed on the monitor 410; preferably, the thermal images are transmitted only in case of alarm activation; however, this is not must be intended as limitative.

Figures 2, 3:
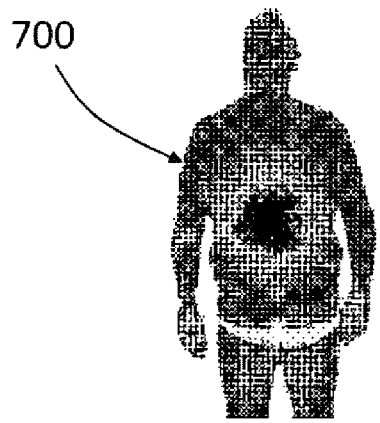
FIG. 2 shows a detail of a thermal image.
FIG. 3 shows a table illustrating a relation between the resolution of a thermocamera, which is part of the present system object of the present invention, and the linear dimension of every single pixel at specific distances from the detected object.

Lastly, as it can be observed in FIG. 3, the thermocamera 110 can have resolutions up to 640×480 pixels that allow detecting objects whose minimum dimension, corresponding to a single pixel, at a distance up to 6 meters from the acquired subject, is not greater than about 16 mm and preferably is of about 10 mm. Therefore, also goods of little size can be effectively detected.

From the above description, advantages of the method object of the present invention are clear. It allows detecting immediately, i.e. in real time, the presence of cold goods on a customer without the need of making a body search. In detail, advantageously cold goods can be detected effectively also if kept under clothes, even thick ones.

Through the method object of the present invention it is possible to carry out a systematic control of all customers without causing appreciable losses of time, as it would happen in case of using the body search control. Moreover, in particular when installed in supermarket of great size, the cost of the system allowing the method of the present invention to be applied, becomes of little importance if compared with the recovery of profit lost due to thefts of goods usually not detected as stolen.

Nevertheless, by the use of the method of the present invention it is possible to reduce the cost coming from the use of many guards.

Lastly, the method object of the present invention allows an intelligent control of stolen goods, by allowing rejecting the objects really not corresponding to goods in freezer or refrigerated cabinets, because of size or thermal differential with respect to the body.

Moreover, advantageously, the criteria identifying goods as stolen goods are such that they might be changed and adapted to real temperature and size of the supermarket, therefore making the system object of the present invention a flexible instrument.

It has to be noticed that, although during the present description it has been referred to a method suitable to be applied inside shops, this choice is not to be considered as limitative as it is always possible the installation of the system, implementing the method of the present invention, inside supermarkets or anyway shops of Mass Merchandise Channels, preferably of foodstuffs, suitable to sell cold products, also not next to one or more cash desks but, for example and not in a limitative way, next to an exit of the shop or supermarket itself.

Additional variations and additions obvious for a person skilled of the art can be applied to the method object of the present invention, without thereby departing from the protection scope provided by the enclosed claims.

The invention claimed is:

1. A method for detecting thefts inside shops, comprising at least one thermocamera, said thermocamera comprising, or being electrically connected with, at least one data processing unit suitable to receive at least one thermal image; said method comprising:
    providing a controlled area of at least part of a thermal image acquired by said thermocamera; said controlled area being defined by a perimeter, said perimeter comprising at least one exit length and at least one payment interface length;
    electronically checking said thermal image for at least one pixel having a detected temperature lower than a value of predetermined minimum temperature;
    electronically associating said at least one pixel with an object to be checked thereby providing an association point between said at least one pixel and said object to be checked;
    plotting the path of said object to be checked from said association point provided by said associating step to an exit point in which said object to be checked exits from said exit length; and
    sending or activating an alarm signal when said plotted path of said object to be checked meets a predetermined criterion
    wherein said predetermined criterion comprises electronically checking that said plotted path of said object to be checked forms a line between said association point and said exit point without intersecting said at least one payment interface length.

2. The method according to claim 1, wherein said controlled area is placed next to at least one respective cash desk for the payment of said products or goods and said at least one thermocamera is installed to detect an image at said at least one respective cash desk.

3. The method according to claim 2, wherein the payment interface length is a perimeter length interposed on said image between said controlled area and said respective cash desk for the payment of products.

4. The method according to claim 1, further comprising detecting a maximum temperature inside said controlled area and secondly associating said maximum temperature with a user, and wherein said predetermined criterion further comprises:
    calculating the user's crossing time as the time passed between said secondly associating step and the moment in which said user exits from said exit length; and
    electronically checking that said user's crossing time is substantially equal to the crossing time of the object to be checked.

5. The method according to claim 1, wherein said step of sending said alarm signal comprises at least one action selected from:
    sending said alarm signal to a remote computer suitable to be electrically connected to user interface means of alarm signals coming from a plurality of cash desks; and
    activating a sound or visual alarm installed on said respective cash desk for the payment of goods.

6. The method according to claim 1, further comprising transmitting at least one radiometric image to a remote computer designed to allow said radiometric image to be represented.

7. The method according to claim 1, further comprising storing data in a memory designed to store data.

8. The method according to claim 5, further comprising representing the condition of said alarm signal transmitted from said at least one thermocamera, by means of said user interface means.

9. The method according to claim 1, further comprising moving said thermocamera along at least one axis.

10. The method according to claim 1, wherein said object to be checked is a frozen or refrigerated good.

11. The method of claim 1, wherein said detected temperature for said at least one pixel is at least 10° C. lower than said value of predetermined minimum temperature.

12. The method of claim 1, wherein said detected temperature for said at least one pixel is at least 30° C. lower than said value of predetermined minimum temperature.

13. The method of claim 1, wherein said value of predetermined minimum temperature is ambient temperature.

* * * * *